(12) United States Patent
Soluri et al.

(10) Patent No.: US 12,514,521 B2
(45) Date of Patent: Jan. 6, 2026

(54) MULTIFUNCTION GAMMA RADIATION DETECTOR

(71) Applicant: CONSIGLIO NAZIONALE DELLE RICERCHE, Rome (IT)

(72) Inventors: Alessandro Soluri, Rome (IT); Roberto Massari, Nettuno (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 353 days.

(21) Appl. No.: 18/017,780

(22) PCT Filed: Jul. 14, 2021

(86) PCT No.: PCT/IB2021/056322
§ 371 (c)(1),
(2) Date: Jan. 24, 2023

(87) PCT Pub. No.: WO2022/023853
PCT Pub. Date: Feb. 3, 2022

(65) Prior Publication Data
US 2023/0284985 A1    Sep. 14, 2023

(30) Foreign Application Priority Data

Jul. 29, 2020  (IT) .................. 102020000018391

(51) Int. Cl.
*A61B 6/42*   (2024.01)
*G01T 1/164*  (2006.01)

(52) U.S. Cl.
CPC .......... *A61B 6/4258* (2013.01); *G01T 1/1642* (2013.01)

(58) Field of Classification Search
None
See application file for complete search history.

(56) References Cited

U.S. PATENT DOCUMENTS 5,823,993 A * 10/1998 Lemelson ............ G01R 33/561
                                                           604/21
6,643,538 B1   11/2003 Majewski et al.
(Continued)

FOREIGN PATENT DOCUMENTS

WO        01/67133        9/2001
WO     2013/168188       11/2013

OTHER PUBLICATIONS

"J E Lees et al.," " A hybrid camera for simultaneous imaging of gamma and optical photons," Jinst 7 P06009 2012. (Year: 2012).*
(Continued)

*Primary Examiner* — Patricia J Park
(74) *Attorney, Agent, or Firm* — NIXON & VANDERHYE

(57) ABSTRACT

A multifunction gamma radiation detector includes a supporting rod, a detection head coupled to or integrated with a first end of the supporting rod including detection elements separate from each other for simultaneously detecting gamma radiation directed along respective directions. Each detection element includes a scintillation crystal and corresponding first electronic conversion circuitry for receiving an optical signal from the crystal and converting it into an electrical signal. The detector also includes a handgrip, connectable to a second end of the supporting rod and which can be manually gripped by an operator to direct the detector, and a second electronic circuitry for converting and/or treating the signals connected to the first electronic conversion circuitry. The head also includes an optical detection device acquiring a sequence of optical signals emitted by a suitably energized body tissue. The detection elements are angularly distributed on the detection head about optical detection device.

20 Claims, 8 Drawing Sheets

(56) References Cited

U.S. PATENT DOCUMENTS

| | | | |
|---|---|---|---|
| 2009/0039268 A1* | 2/2009 | Peter .................... | A61B 5/0073 |
| | | | 250/363.04 |
| 2010/0090120 A1* | 4/2010 | Soluri ................... | G01T 1/1644 |
| | | | 250/370.11 |
| 2013/0158389 A1* | 6/2013 | O'Connor .............. | A61B 90/17 |
| | | | 600/436 |
| 2020/0305972 A1* | 10/2020 | Kadamus ........... | A61B 18/1492 |
| 2021/0121145 A1* | 4/2021 | Turner .................... | A61B 6/02 |

OTHER PUBLICATIONS

International Search Report for PCT/IB2021/056322, mailed Sep. 30, 2021, 3 pages.

Written Opinion of the ISA for PCT/IB2021/056322, mailed Sep. 30, 2021, 6 pages.

\* cited by examiner

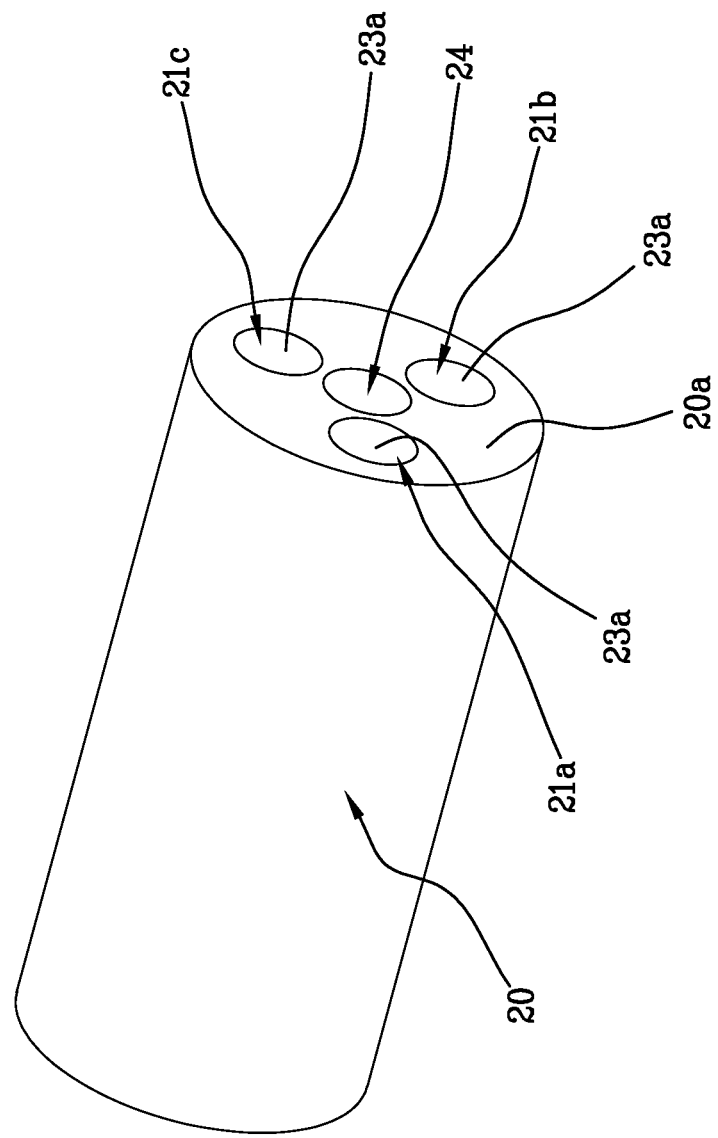

MULTIFUNCTION GAMMA RADIATION DETECTOR

This application is the U.S. national phase of International Application No. PCT/IB2021/056322 filed Jul. 14, 2021, which designated the U.S. and claims priority to IT patent application Ser. No. 10/202,0000018391 filed Jul. 29, 2020, the entire contents of each of which are hereby incorporated by reference.

BACKGROUND OF THE INVENTION

Field of the Invention

The present invention relates to a multifunction gamma radiation detector which can be widely applied in the field of radio-guided surgery (intraoperative and laparoscopic) for locating lymph nodes and tumours and/or other pathologies.

Description of the Related Art

As is known, gamma detectors are instruments used to locate tumour cells or specific pathologies in a patient by picking up the radiation emitted by a radiopharmaceutical previously administered to the patient and which tends to concentrate in the cells affected by those pathologies.

Generally speaking, gamma detectors comprise a detection head equipped with a single crystal or a plurality of crystals suitably oriented and configured to absorb the gamma rays emitted by the radiopharmaceutical. The prior art scintigraphic detectors also comprise a rod configured to receive at one end the detection head and at a further end a handgrip configured for suitably directing the detection head during the medical application.

In particular, gamma detectors are known the detection head of which is made of a material with a high atomic number and has a plurality of detection elements each comprising a scintillation crystal. These crystals are distinct from each other and aligned according to respective different collimation axes for simultaneously detecting gamma radiation directed in different directions. Each detection element is preferably associated with a collimator suitable to screen the gamma radiation striking on the detection element with an external angle to a predetermined external solid angle. These detectors usually have an axial collimator and at least two lateral collimators, inclined with respect to the axial collimator in such a way that the central crystal acts as a true and proper detector whilst the lateral crystals act as direction sensors to indicate to the operator where to direct the instrument during the medical analysis.

There are also prior art detectors the head of which comprises, in addition to scintillation crystals, optical devices such as, for example, video cameras which provide a visual image of the zone affected by the pathology.

More specifically, detectors are known which are equipped with a plurality of detection elements the collimation axes of which extend parallel to the development axis of the head and with a camera/video camera located in a central portion of the head in place of the central scintigraphic crystal.

More generally, therefore, there are prior art gamma detectors the detection elements of which are configured to locate a zone affected by a pathology and wherein the camera/video camera is designed to contribute to the accelerating of the operations for locating the zone affected by the pathology.

Prior art detectors disadvantageously have drawbacks linked to the precision, the cost and the poor versatility thereof.

In particular, in detectors equipped with optical devices the distribution of the detection elements is not optimal since the analysis which is obtained favours the information deriving from some crystals with respect to the others, giving rise to results which are not precise and, therefore, poorly reliable.

A further drawback relates to the fact that these detectors have solid detection angles with amplitudes that are insufficient to perform an angular detection over a large area, thus penalising the detection speed which requires a greater skill of the operator and/or implies a greater number of manoeuvres performed by the operator to trace the correct aligned position of the detection head with the source of emission and therefore with the zone affected by the pathology.

More generally therefore, prior art detectors do not have arrangements of the detection elements and the optical device which are favourable to a precise and rapid analysis of the part of the patient affected by the pathology.

A further drawback derives from the fact that the known detectors have poor operational flexibility, since the application thereof is limited to the specific use for the identification of the position of a tumour and/or other pathologies and, in the case of different uses, it is necessary to have available additional instrumentation with a considerable increase in costs.

Despite the possibility of integrating the detection head by means of an optical detection device, it is not able to provide immediate information regarding the nature of the pathology.

In other words, these devices are not able to allow an in vivo analysis of the zone identified by the detection elements as the zone affected by the pathology, since they are not able to provide information regarding the chemical composition and/or the structure of the zone. It is not, for example, possible, by means of known detectors, to perform an assessment of the wounded/affected tissue in order to focus more accurately on the possible excision of the part.

Therefore, and disadvantageously, prior art gamma detectors, as they are not able to provide in vivo information regarding the nature of the pathology, always implicate, after the localisation of the pathology, the intervention on the patient of further instrumentation, making the medical analysis rather invasive, long and expensive.

Known directional gamma detectors are therefore not able to integrate different medical investigation methods in the same instrument.

SUMMARY OF THE INVENTION

The technical purpose of the present invention is therefore to provide a multifunction gamma radiation detector which is able to obviate the drawbacks of the prior art.

The aim of the present invention is to provide a gamma detector which, once the zone of the patient affected by the pathology has been located, is able to perform an in vivo analysis of the nature of the pathology during radio-guided surgery.

A further aim of the present invention is to provide a gamma detector which allows a precise and fast localisation of the zone affected by the pathology.

The aim of the present invention is to provide a gamma detector which is extremely precise and reliable.

A further aim of the present invention is to provide a gamma detector which is extremely versatile in use.

A further aim of the present invention is to provide a gamma detector having dimensions also compatible with a laparoscopic use in a trocar.

The technical purpose indicated and the aims specified are substantially achieved by a multifunction gamma radiation detector comprising the technical features disclosed and claimed.

In particular, the technical purpose is achieved by a multifunction gamma radiation detector comprising a supporting rod, a detection head coupled or integrated with a first end of the supporting rod and comprising a plurality of detection elements which are separate from each other for simultaneously detecting gamma radiation directed along respective directions. Each detection element comprises at least one scintillation crystal and a corresponding first electronic conversion circuitry for receiving an optical signal from the crystal and converting it into an electrical signal, each of the detection elements is further associated with a respective collimator made of a material with a high atomic number and designed to screen the gamma radiation striking on the detection element with an external angle and a predetermined solid angle. The multifunction gamma radiation detector according to the present invention further comprises a handgrip connected or connectable to a second end of the supporting rod and which can be manually gripped by an operator to direct the detector and a second electronic circuitry for converting and/or treating the signals, preferably arranged inside the handgrip, connected to the first electronic conversion device for processing the electrical signal generated by the first electronic conversion circuitry. The detector according to the present invention is characterised in that the detection head also comprises at least one optical detection device configured to acquire a sequence of optical signals emitted by a suitably energised body tissue and in that the detection elements are angularly distributed on the detection head around the at least one optical detection device.

The optical detection device can preferably be selected from among: micro-structured fibres; a phoswitch; an optical system for holographic microscopy. Preferably, the optical detection device has an optical detection axis parallel to or coinciding with a longitudinal axis of extension of the detection head while the detection elements have respective collimation axes which are inclined relative to the optical detection axis, preferably by an angle of between 0° and 90°.

According to a possible embodiment, the detection elements have respective collimation axes that diverge out from the detection head. Alternatively, the respective collimation axes of the detection elements converge out from the detection head.

Advantageously, thanks to the presence of the optical detection device, the multifunction gamma radiation detector allows in vivo analyses to be performed on the nature and composition of the pathology detected during the analysis.

In other words, once the zone of the patient affected by the pathology has been localised by using the detection elements, the optical detection device allows data to be obtained relating to the nature and structure of the localised pathology thereby providing a first base for medical diagnosis without the need to introduce further medical instrumentation in the patient and/or without the need to perform an excision of the affected zone.

Further features and advantages of the present invention will more fully emerge from the non-limiting description that follows of a non-exclusive embodiment of a multifunction gamma radiation detector.

BRIEF DESCRIPTION OF THE DRAWINGS

The description is set out below with reference to the accompanying drawings which are provided solely for purposes of illustration without restricting the scope of the invention and in which:

FIG. 2 is a perspective view of a detection head included in the multifunction gamma radiation detector, object of the invention;

DESCRIPTION OF THE PREFERRED EMBODIMENTS

With reference to the accompanying drawings, the letter "R" denotes a multifunction gamma radiation detector according to the present invention.

Figure 1:
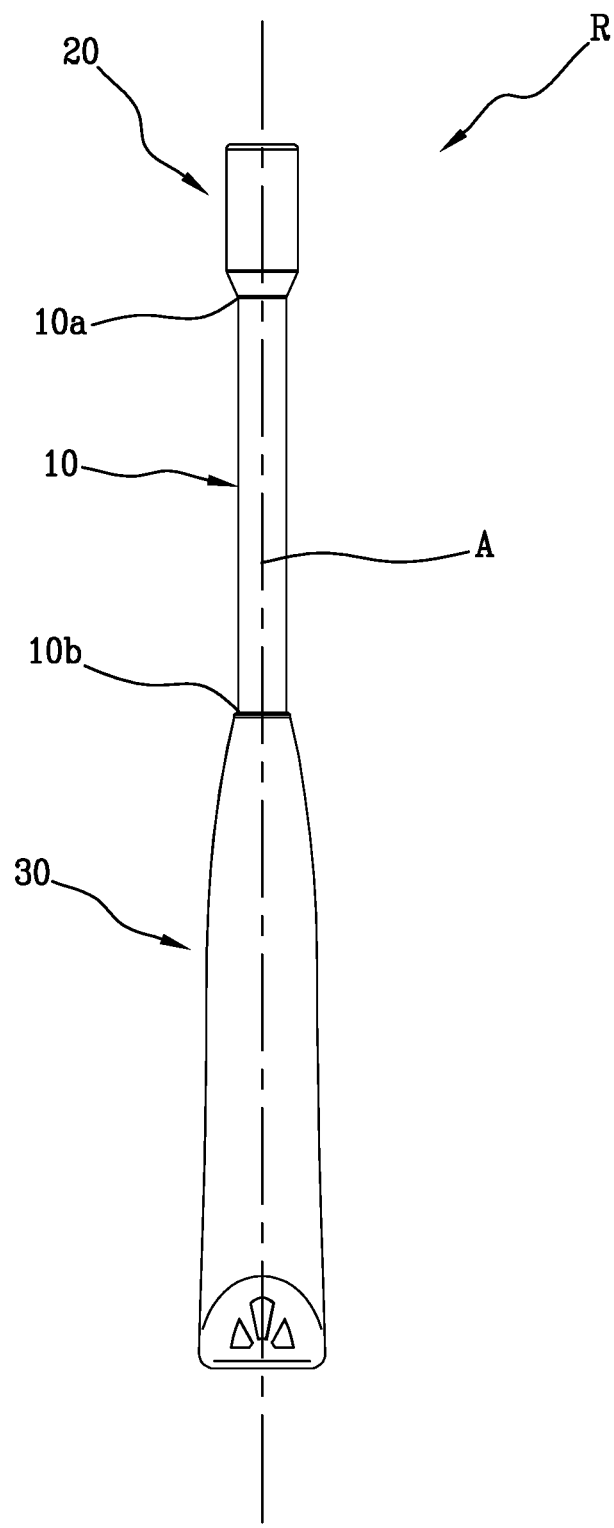
FIG. 1 is a frontal view of a multifunction gamma radiation detector.

As shown in FIG. 1, the detector "R" comprises a supporting rod 10, a detection head 20 coupled or integrated to a first end 10a of the supporting rod 10 and a handgrip 30 connected to or connectable to a second end 10b of the supporting rod 10 and which can be manually gripped by an operator to direct the detector "R" during a medical analysis.

More in detail, the supporting head 20 is made in the form of a solid body having a cylindrical shape preferably extending along a longitudinal axis of extension "A" and having a flat front surface 20a also perpendicular to the longitudinal axis of extension "A".

The term "solid body" is used to mean a block made of a single material.

In the preferred embodiment, the detection head 20 is made of a material with a high atomic number, for example lead, designed to absorb and screen the gamma radiation emitted by a radiopharmaceutical.

The solid body comprises a plurality of detection elements 21a, 21b, 21c distinct from each other for simultaneously detecting gamma radiation directed along respective directions different to each other.

In the embodiment illustrated in the accompanying figures of the drawings, the detection head 20 comprises three detection elements 21a, 21b, 21c angularly spaced from each other by an angle having an amplitude, measured on the plane defined by the front surface 20a of the detection head 20, equal to 120°.

Figure 3A:
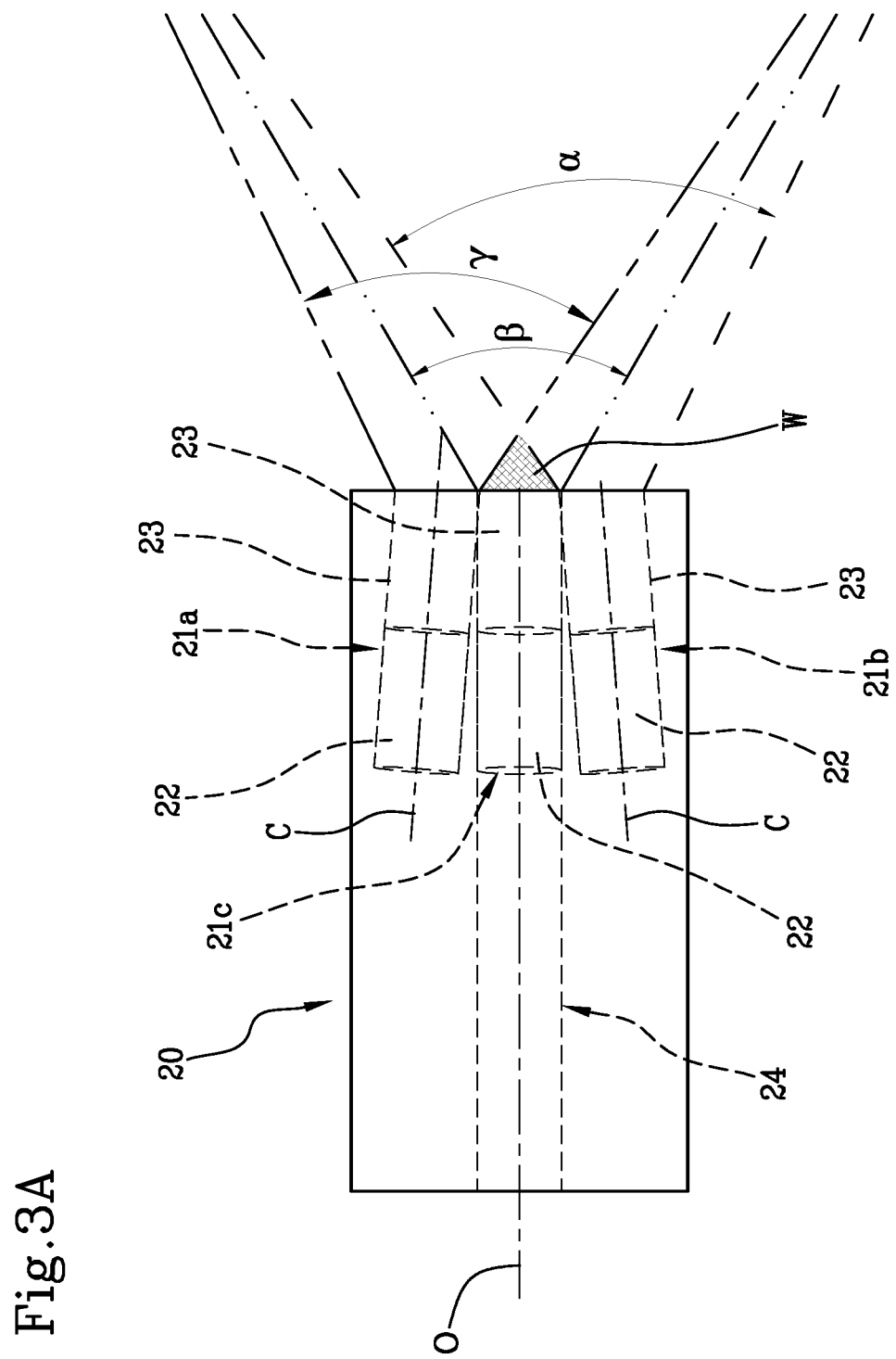
FIGS. 3A and 3B show respective embodiments of a cross-section view according to a longitudinal plane of a detection head.
Figure 3B:
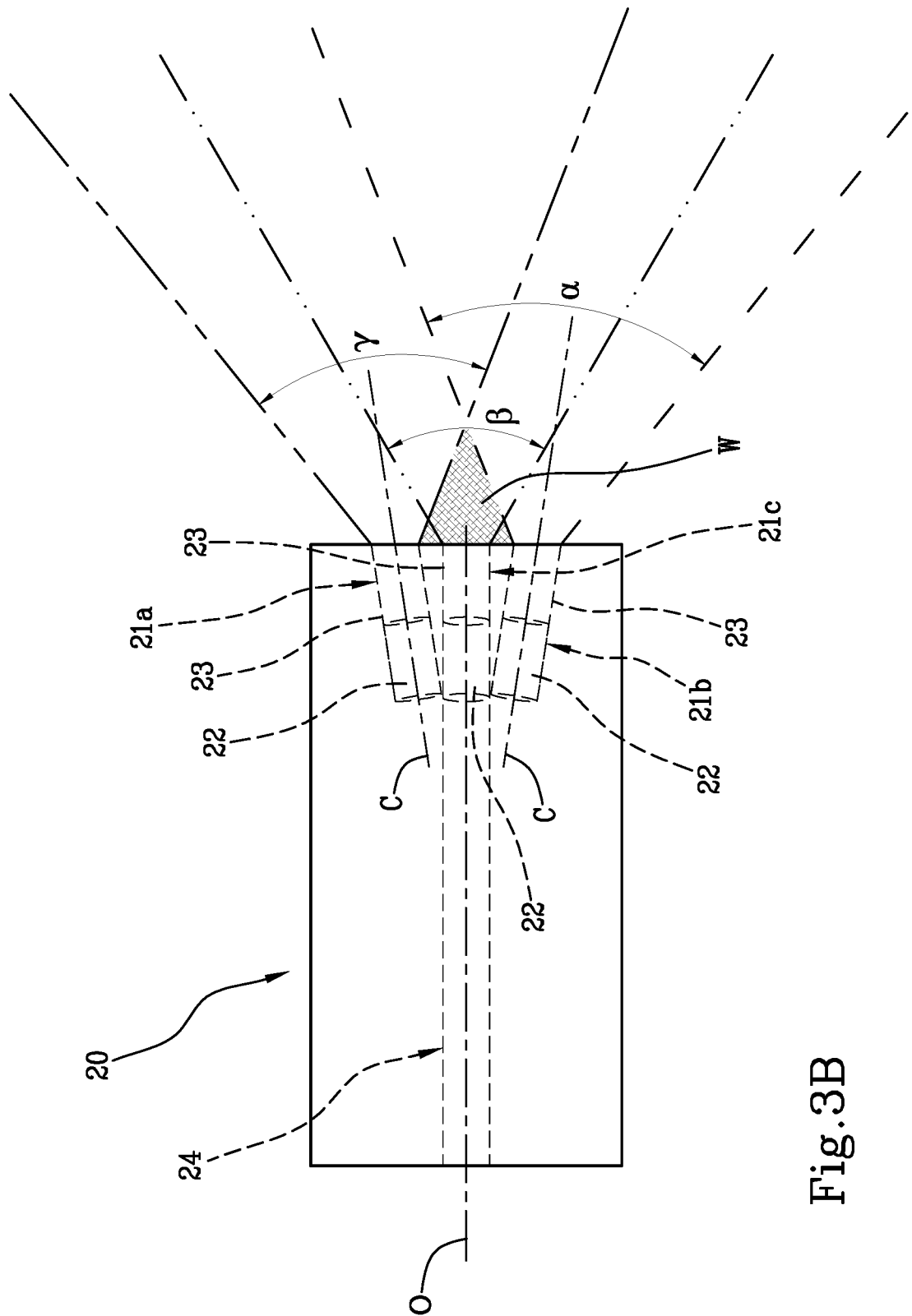

As shown in FIGS. 3A and 3B, each detection element 21a, 21b, 21c comprises at least one scintillation crystal 22 and a corresponding first electronic conversion circuitry (not illustrated) for receiving an optical signal from the scintillation crystal 22 and converting it into an electric signal. Preferably, the scintillation crystals 22 are sensitive to gamma radiation having energy of between 0 keV and 250 keV.

With reference to the embodiment shown in the accompanying figures of the drawings, each detection element 21a, 21b, 21c is also associated with a respective collimator 23.

Preferably, each collimator 23 comprises a detection channel made of the same material as the detection head 22. Each collimator 23 has a respective opening 23a lying on the front surface 20a of the detection head 20 and a bottom on which the scintillation crystal 22 lies in such a way that a portion of the lateral wall of the detection channel, comprised between the crystal 22 and the external opening 23a of the channel, defines a solid detection angle α, β, γ and thus determines the collimation of the radiation directed towards the crystal 22.

Still more preferably, each collimator 23 is made of a material with a high atomic number and is therefore suitable to screen the gamma radiation striking on the detection element 21a, 21b, 21c with an external angle to the solid angle α, β, γ defined by the respective collimator 23. In this way, only gamma radiation having an angle within the solid detection angle α, β, can be effectively absorbed by the scintillation crystal 22 and converted, by the first electronic conversion circuitry, into an electrical signal.

As shown in detail in FIGS. 3A and 3B, the detection elements 21a, 21b, 21c also define respective solid detection angles α, β, conformed and/or oriented in such a way as to define between them a blind zone "W" external of the solid detection angles α, β, γ.

The blind zone "W" is therefore projecting to a central portion of the front surface 20a of the detection head 20.

The blind zone "W" extends for a length having a minimum value of approximately 5 mm and a maximum value, approximately equal to 50 mm. The length of the blind zone "W" is measured starting from the front surface 20a of the detection head 20 and its overall value varies on the basis of a configuration of the detection elements 21a, 21b, 21c on the detection head 20.

More in detail, in the case of a configuration wherein the detection elements 21a, 21b, 21c are arranged in a convergent fashion (FIG. 3A), the blind zone "W" may have a length of between zero and the above-mentioned minimum value while, in the case of a divergent configuration (FIG. 3B), the blind zone "W" may have a length of between zero and the above-mentioned maximum value.

In other words, in the case of a convergent configuration, the blind zone "W" may extend up to a maximum of 5 mm from the front surface 20a, while on the other hand, in the case of a divergent configuration, the blind zone "W" may extend up to 50 mm, preferably up to 20 mm, from the front surface 20a of the detection head 20.

This aspect of the present invention is particularly advantageous for precise and reliable localisation of the part of the patient affected by the pathology, as described in detail below.

The detector "R" according to the present invention also comprises a handgrip 30 connected or connectable to a second end 10b of the supporting rod 10 and which can be gripped manually by an operator to direct the detector "R" during medical analysis.

The handgrip 30 has a transversal dimension greater than the transversal dimension of the supporting rod 10 and is reversibly connectable to the second end 10b of the supporting rod 10 by a mechanical connector (not illustrated) equipped with electrical contacts.

Inside the handgrip 30, the detector "R" comprises a second electronic circuitry for converting and/or treating the signals connected to the first electronic conversion circuitry for processing the electric signal generated by the first electronic converter. In particular, the second electronic conversion circuitry converts the analog signals coming from each of the first electronic conversion circuitry into digital signals.

The transfer of the signals coming from the first electronic conversion circuitry to the second electronic conversion circuitry takes place via the electrical contacts present in the mechanical connector of the handgrip 30.

Owing to the mechanical connector it is advantageously possible to connect a plurality of supporting rods 10 having different detection heads 20 (for example, angled detection heads or heads for laparoscopic analysis) to the same handgrip 30 in a fast and easy manner Owing to the presence of the mechanical connector equipped with electrical contacts, the second electronic conversion circuitry can therefore receive the signals coming from the first electronic conversion circuitry of the various detection heads 20 which can be applied on the handgrip 30. This aspect considerably reduces the costs of the multifunction gamma radiation detector "R" since only one second electronic conversion circuitry is sufficient to operate with different detection heads 20.

In use, therefore, the detection head 20 necessary for medical analysis is mounted on the handgrip 30 by means of the mechanical connector. Next, the detection head 20 is inserted in a patient's cavity and oriented by the operator into that cavity in such a way that the detection elements 21a, 21b, 21c can absorb the gamma radiations at an internal angle of the solid angles α, β, γ defined by the detection elements 21a, 21b, 21c. The gamma radiation absorbed by each detection element 21a, 21b, 21c are converted into electric signals by the first electronic conversion circuitry and then transferred to the second electronic conversion circuitry in such a way that the signals are digitalised.

To process the signals and facilitate the localisation of the zone affected by pathology "P", the detector "R" also comprises a processing and control unit (not illustrated) configured to receive and process the signals coming from the second electronic conversion circuitry.

The processing and control unit is preferably connected to the second electronic conversion circuitry of the handgrip 30 by Wi-Fi, Bluetooth or via cable in such a way that the signals are transmitted from the second electronic conversion circuitry to the control unit.

Still more preferably, the control unit comprises a monitor (not illustrated), which shows the operator the processing of the signals coming from the detector "R".

To facilitate the localisation of the zone affected by pathology "P", the processing and control unit further comprises, integrated thereto, a sound signalling device (not illustrated) configured to emit an acoustic signal which is directional or at a different intensities/frequencies according to the detection element 21a, 21b, 21c most affected by the radiation at a given instant.

Alternatively, or in addition to the sound signalling device, the processing and control unit also comprises a visual signalling device, for example a flashing LED, configured to emit a visual signal according to the detection element 21a, 21b, 21c struck most by the radiation at a given instant.

The processing and control unit 30, following processing of the signals from the detector "R", thus informs the operator about the direction of greatest origin of the gamma radiation and hence about the direction in which the detector "R" is to be positioned. The use of the monitor together with the acoustic and/or visual signal thus constitutes a "navigating system" inside a patient's cavity.

In use, therefore, gamma radiation having different directions strikes the detection head 20 but only the radiations having directions falling within the solid angles α, β, γ, defined by the detection elements 21a, 21b, 21c are effectively absorbed and converted into electric signals by the first electronic conversion circuitry. These electric signals are transmitted to the second electronic conversion circuitry in such a way as to be transformed into digital signals. The signals are then sent to the processing and control unit which analyses them, processes them and indicates to the operator where to direct the detection head 20.

In particular, for each detection element 21a, 21b, 21c a value is derived that relates to a quantity of gamma rays absorbed.

If the gamma ray source, that is to say, the zone affected by the pathology "P", is outside the blind zone covered by the openings of the solid angles α, β, γ, at least some detection elements 21a, 21b, 21c give rise to non-zero values.

Figure 4A:
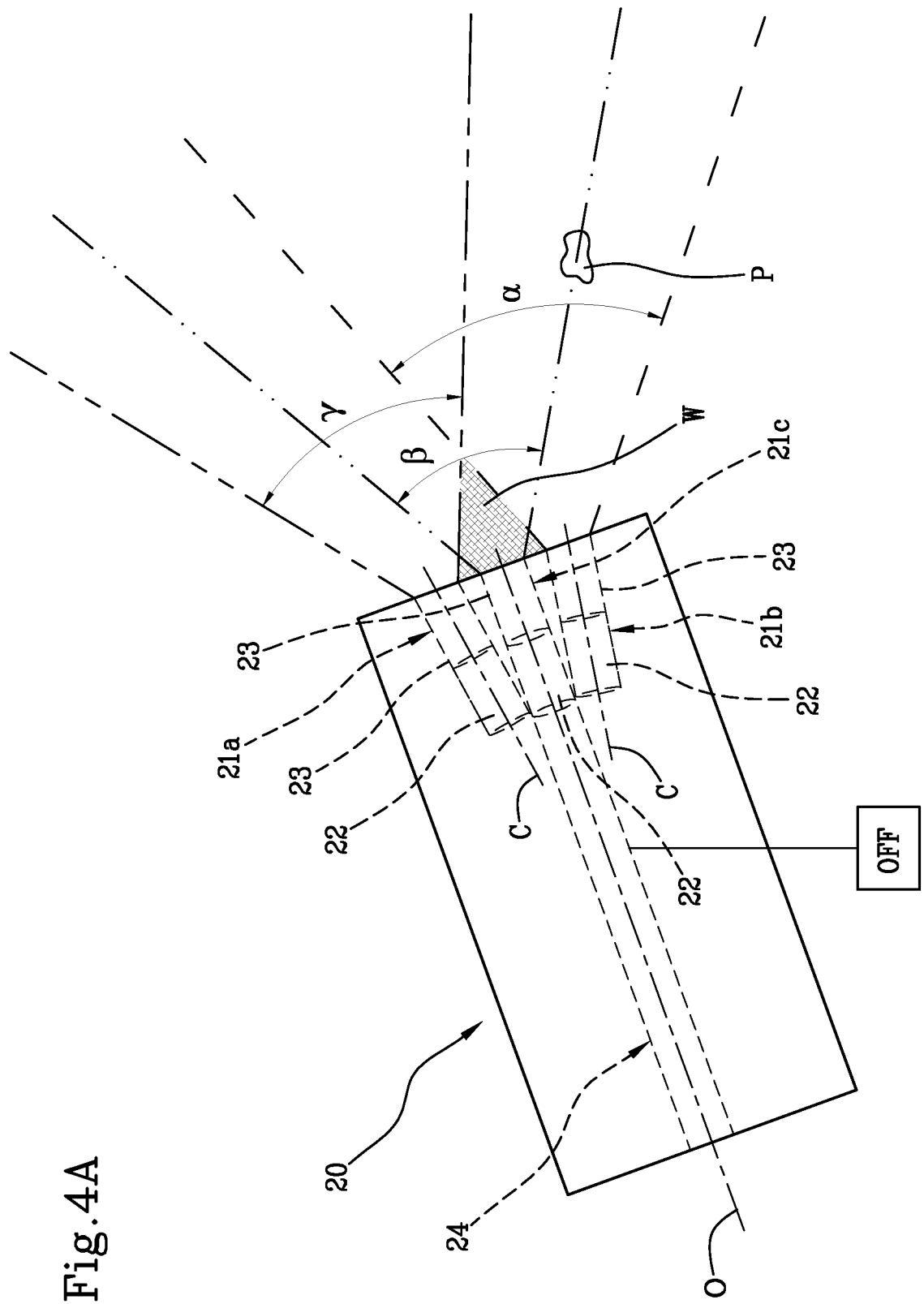
FIGS. 4A-4D show a sequence of cross section views along a longitudinal plane of a detection head during use of the multifunction gamma radiation detector according to the present invention.

In the situation shown in FIG. 4A, for example, the zone affected by the pathology "P" is located in a zone comprised between the solid angles α, β described by only two detection elements 21b, 21c. In this situation, therefore, only the above-mentioned two detection elements 21b, 21c absorb the gamma radiation coming from the zone affected by the pathology "P", thus giving significant values which are significantly not zero. On the other hand, the third detection element 21a does not absorb gamma radiation coming from the zone affected by the pathology "P" and therefore mainly records background noise, thus giving a non-significant value.

In this situation, on the basis of the values recorded by the various detection elements 21a, 21b, 21c, the operator identifies (autonomously or by means of a suitable automatic audio-visual signal) an unbalancing of the overall reading of the detection elements 21a, 21b, 21c corresponding to a position of the detection head 20 which is not frontally aligned to the affected zone P. The detection head 20 is then oriented in such a way that the source falls in the zone where the solid detection angles α, β, γ intersect, that is to say, in the zone in which all the detection elements 21a, 21b, 21c simultaneously result in non-zero and homogeneous values.

Figure 4B:
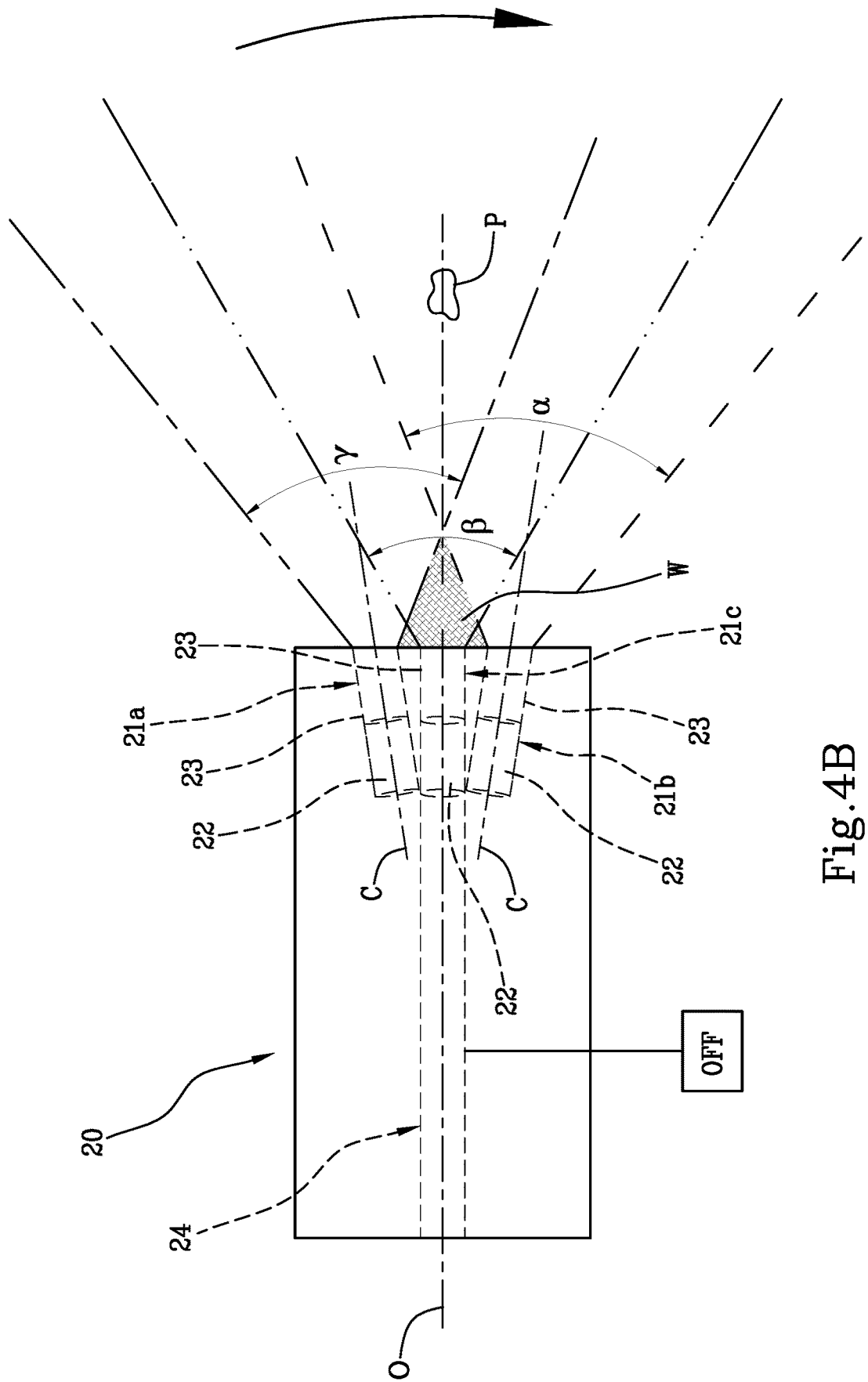

As shown in the example of FIG. 4B, following the acquisition of the values coming from the detection elements 21a, 21b, 21c, the detection head 20 is oriented in such a way as to be rotated in the direction of greatest origin of the gamma radiation.

The operations for reading the values measured by the detection elements 21a, 21b, 21c and the consequent re-directing of the detection head 20 are then repeated until all the detection elements 21a, 21b, 21c obtain values which are homogeneous, that is, practically identical to each other (balancing of the readings of the individual detection elements 21a, 21b, 21c).

In this situation, the detection head 20 is arranged in such a way that the zone affected by the pathology "P" is comprised in the zone of intersection between the openings of each of the solid detection angles α, β, γ.

Figure 4C:
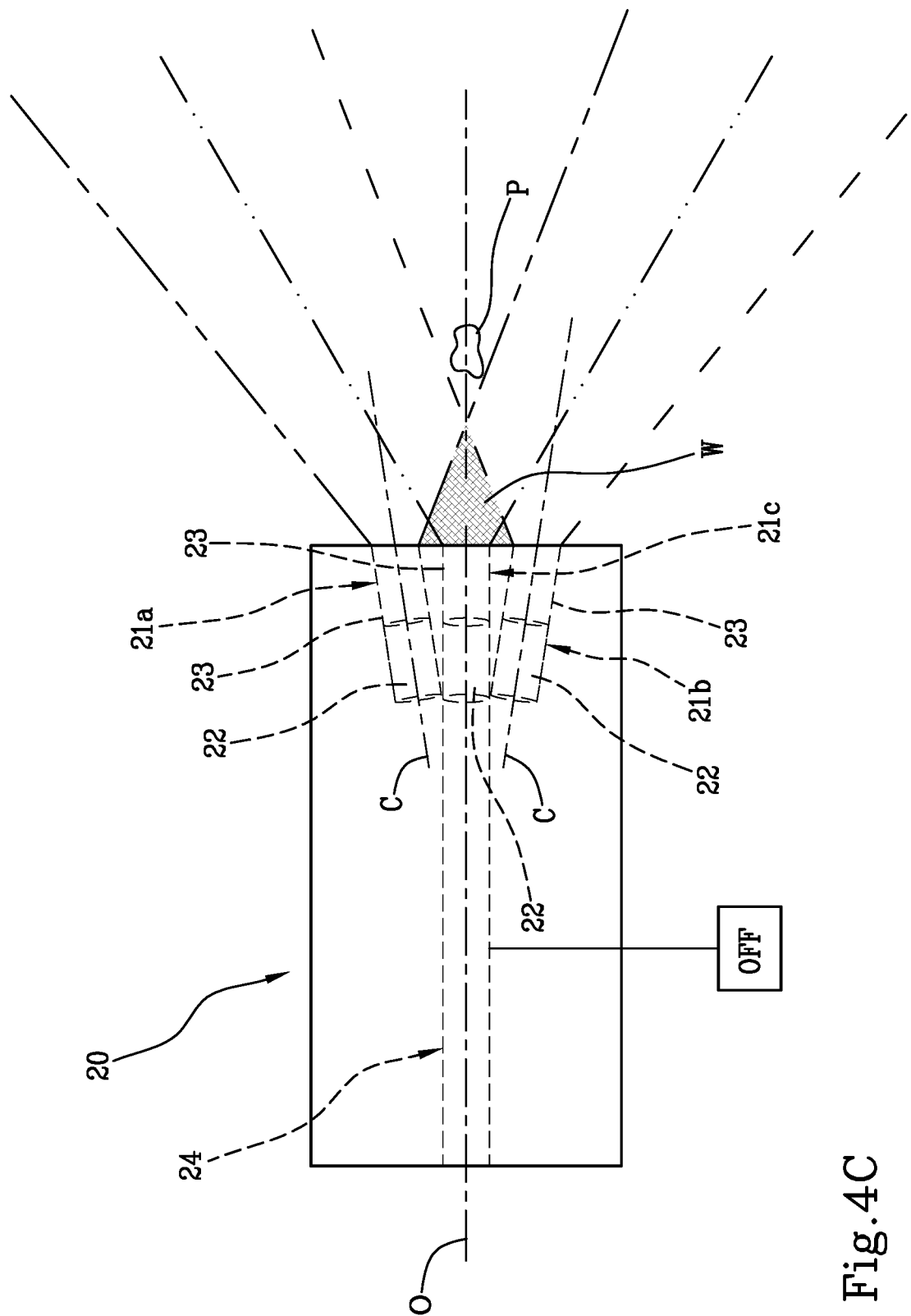

As shown in FIGS. 4B and 4C, the detection head 20 is therefore aligned with the zone affected by the pathology "P" which is therefore located in a space in which all the solid angles α, β, described by the detection elements 21a, 21b, 21c intersect each other.

By keeping this orientation and positioning, the detection head 20 is moved towards the gamma ray source in an axial direction, that is to say, to the zone "P", until the values recorded for each detection element 21a, 21b, 21c are cancelled or reach a value below a predetermined threshold. In this situation, the gamma ray source is in the blind zone "W" exactly located in front of the centre of the detection head 20.

In this situation, the relative position of the detection head 20 with respect to the zone affected by the pathology "P" is optimal for performing an optical imaging type analysis as described in detail below.

The detection head 20 is also equipped with at least one movement sensor (not illustrated), preferably an accelerometer and/or a gyroscope, configured to acquire data relative to the instantaneous position of the detection head 20 in space. During the process for locating the part affected by the pathology, the movement sensor records the instantaneous position of the detection head 20 and transfers the position to the processing and control unit. This aspect is particularly advantageous since, once the part affected by the pathology has been located, the position sensor adjusts the position of the head 20 allowing the zone to be more quickly localised in the case of subsequent analyses.

As shown in FIG. 1, the head of the detector 20 of the present invention also comprises at least one optical detection device 24 configured to acquire a sequence of optical signals emitted by a body tissue suitably energised for example by light coming from the optical detection device 24 or by means of a contrast drug previously assumed by the patient.

The optical detection device 24 can be selected from: micro-structured fibres; phoswitch; optical system for holographic microscopy.

The optical detection device 24 advantageously makes it possible to acquire data relating to the nature, structure and composition of the zone affected by the pathology "P", thus facilitating a medical analysis by the operator.

The optical detection device 24 advantageously makes it possible to obtain maps of biological structures which can, if necessary, be displayed on a monitor. In other words, the detection device 24 is not limited to providing images of the zone affected by the pathology but makes it possible to derive information useful for an in-situ analysis of the pathology.

Preferably, the optical detection device 24 occupies a central position of the detection head 20 whilst the detection elements are angularly distributed around it. This distribution on the detection head 20 advantageously makes it possible to quickly locate the part affected by the pathology thanks to the detection elements 21a, 21b, 21c and then to perform an in-situ analysis on the nature of the pathology that is precise and reliable.

In other words, the detection elements 21a, 21b, 21c are angularly distributed on the detection head 20 about the optical detection device 24 in such a way as to form a "crown" about the optical detection device 24.

The optical detection device 24 has an optical detection axis "O" parallel to or coinciding with the longitudinal axis of extension "A" of the detection head 20.

The optical detection device 24 has preferably an optical detection axis "O" coinciding with the longitudinal axis of extension "A".

Still more preferably, the optical detection device 24 has the optical detection axis "O" passing through the blind zone "W".

The detection elements 21a, 21b, 21c, on the other hand, have respective collimation axes "C" which are inclined relative to the optical detection axis "O". The collimation axes "C" of the detection elements 21a, 21b, 21c are preferably inclined at an angle of between 0° and 90° relative to the optical detection axis "O".

The presence of the detection elements 21a, 21b, 21c together with the optical detection device 24 makes the multifunction gamma radiation detector "R" particularly efficient and versatile.

By using the detection elements 21a, 21b, 21c the multifunction gamma radiation detector "R" is in effect able to locate the zone affected by the pathology "P" in a fast and precise manner, while, thanks to the presence of the optical detection device 24, the detector "R" is useful for carrying out in sharp analyses of the zone just identified.

With reference to FIGS. 4A-4D, the use of the multifunction gamma radiation detector "R" is described in more detail, in which the combination between the scintigraphic investigation by the detection elements 21a, 21b, 21c and the optical investigation by the optical detection device 24 is made clear.

In use, therefore, the multifunction scintigraphic detector "R" is inserted in a cavity of the patient in such a way that the detection elements 21a, 21b, 21c absorb the gamma radiation emitted by the zone affected by the pathology "P" and comprised in the solid angles $\alpha$, $\beta$, $\gamma$.

In the situation shown in FIG. 4A, the zone affected by pathology "P" is located in a zone comprised between the solid angles $\alpha$, $\beta$ described by only two detection elements 21b, 21c. In this situation, therefore, only the above-mentioned two detection elements 21b, 21c absorb the gamma radiation coming from the zone affected by pathology P. The gamma radiation absorbed by these detection elements 21b, 21c are transformed into electric signals and processed by the processing and control unit which derives two significantly non-zero values therefrom. On the other hand, the third detection element 21a does not absorb gamma radiation coming from the zone affected by the pathology "P" and therefore mainly records background noise, thus giving a non-significant value.

In this situation, the processing and control unit thus indicates to the operator, for example via a monitor or by visual and/or acoustic signals, in which direction to direct the detection head 20.

In effect, as shown in FIG. 4B, after acquiring the values coming from the detection elements 21a, 21b, 21c, the detection head 20 is oriented in such a way as to be rotated in the direction of the greatest origin of the gamma radiation, that is to say, towards the zone indicated by the two most involved detection elements 21b, 21c.

In other words, noting that the above-mentioned two detection elements 21b, 21c result in values greater than the one indicated by the remaining detection element 21a, the operator rotates the detection head 20 towards the direction indicated by the two detection elements 21b, 21c.

In this situation, therefore, thanks to a reading of the values for absorbing the gamma rays indicated by the detection elements 21a, 21b, 21c it is possible to orient the detection head 20 in a reliable and rapid manner More in detail, in the case of a "unbalanced" reading, that is to say, a reading in which the values are very uneven to each other (like the one obtained in the situation of FIG. 4A), the detection head 20 is oriented towards the direction of greatest origin of the gamma rays, that is to say, the highest value of the detection head 20 is oriented in the direction indicated by the detection element 21a, 21b, 21c.

All the detection elements 21a, 21b, 21c advantageously actively contribute to the localisation of the pathology in such a way as to allow an identification of the affected zone in a fast and reliable manner.

The operations for reading the values measured by the detection elements 21a, 21b, 21c and the consequent re-directing of the detection head 20 are then repeated until all the detection elements 21a, 21b, 21c result in homogeneous values, that is to say, almost equal to each other. In this situation, the detection head 20 is positioned in such a way that the zone affected by the pathology "P" is located in the zone of intersection between the openings of each of the solid detection angles $\alpha$, $\beta$, $\gamma$, that is to say, in the zone where all the detection elements 21a, 21b, 21c detect the same quantity of gamma radiation.

As shown in FIGS. 4B and 4C, in the above-mentioned situation, the detection head 20 is thus aligned with the zone affected by the pathology P.

In more detail, the detection head 20 is aligned with the zone affected by the pathology "P" along the optical detection axis "O".

By keeping this orientation and positioning, the detection head 20 is thus moved close to the source, that is to say, to the zone affected by the pathology "P".

During this movement towards each other, unlike known traditional detection heads, the values recorded by each detection element 21a, 21b, 21c diminish and are more homogeneous the more the approach is performed in an axial/longitudinal direction. This reduction is due to the fact that the more the detection signal 20 is neared to the zone affected by the pathology "P" the more it moves towards the end regions of the collimation fields of the detection elements 21a, 21b, 21c, moving more and more towards the blind zone "W", then definitively leaving the fields on reaching the blind zone "W".

The movement of the detection head 20 towards the zone affected by the pathology "P" continues until the values recorded for each detection element 21a, 21b, 21c are substantially zero or below a predetermined threshold. In this situation, it is ensured that the gamma ray source is located within the blind zone "W", that is to say, it is located exactly in front of the centre of the detection head 20 in a zone not covered by any solid angle $\alpha$, $\beta$, $\gamma$.

Owing to the symmetrical distribution of the detection elements 21a, 21b, 21c about the optical detection device 24, there is the certainty that when the detection elements indicate the same absorption value of the gamma radiation, the zone affected by pathology "P" is aligned with a central portion of the detection head 20, i.e. aligned with the optical detection device 24.

For a correct positioning of the detection head 20 relative to the zone affected by the pathology "P" the decrease of the gamma radiation values absorbed by the detection elements 21a, 21b, 21c is advantageously exploited, i.e. the presence of the blind zone "W" is used. This situation therefore guarantees both the fact that the zone affected by the pathology "P" is exactly aligned with the optical detection axis "O" of the optical detection device 24 and the fact that it is located at a minimal distance from a central zone of the front surface 20a of the detection head 20.

Figure 4D:
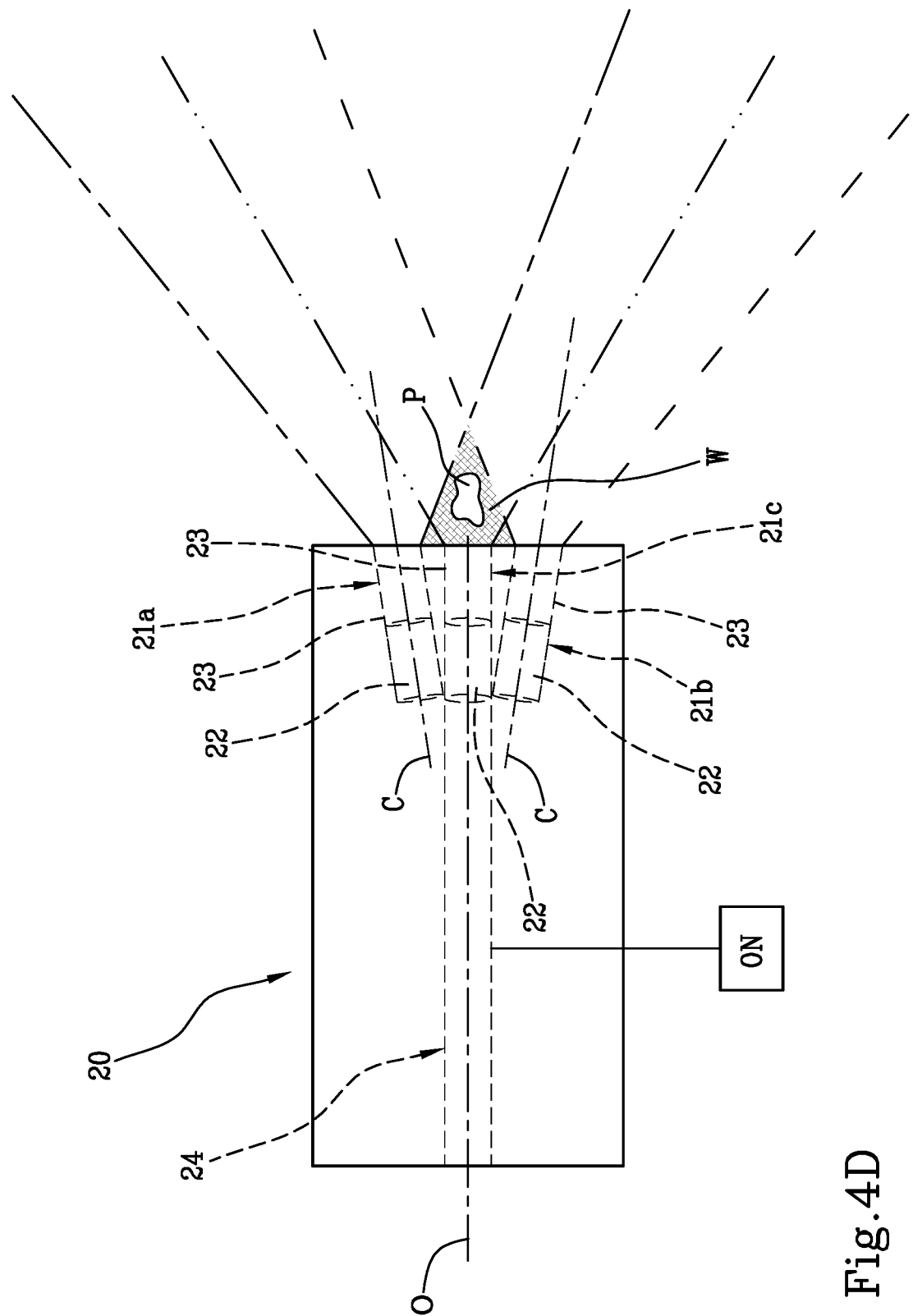

As shown in FIG. 4D, once the zone affected by the pathology "P" is located inside the blind zone "W", the optical detection device 24 may be activated to carry out an optical type analysis of the optical imaging type.

At the end of the localisation process, the position of the detection head 20 relative to the zone affected by the pathology "P" is advantageously optimal for carrying out the subsequent optical type analyses since the zone affected by the pathology "P" is at a minimum distance from the front surface 20a of the detection head 20 and is also centred relative to the detection head 20 along the optical detection axis "O".

The purpose of the scintigraphic method is therefore to navigate inside the tissue and analyse the presence of pathologies, gradually moving towards a distance at which the detection elements 21a, 21b, 21c no longer detect gamma rays. This condition occurs because the detection elements 21a, 21b, 21c are located on the outermost part of the front surface 20a of the detection head 20 and are set at an angle to each other and collimated according to established ratios, and are able to select even a deep-seated lesion. This arrangement makes it possible to use the central zone of the detection head 20 for housing the optical detection device 24 in such a way as to perform a further and local analysis on the nature of the tissue.

In the embodiment shown in FIG. 3A, the collimation axes "C" of the detection elements 21a, 21b, 21c diverge at the outlet from the detection head 20. As described above, this arrangement defines a blind zone "W" having an extension variable between 0 mm and 50 mm, preferably between 5 mm and 50 mm and more preferably between 5 mm and 20 mm.

In the embodiment shown in FIG. 3B, on the other hand, the detection elements 21a, 21b, 21c have respective converging collimation axes "C" at the outlet from the detection head 20. In this situation, the blind zone "W", on the other hand, has a smaller extension (preferably between 0 mm and 5 mm) and therefore allows the zone affected by the pathology "P" to be placed closer to the optical detection device 24.

In use, therefore, once, thanks to the detection elements 21a, 21b, 21c, the detection head 20 is positioned in such a way that the zone affected by the pathology "P" is arranged frontally thereof and within the blind zone "W", the optical detection device 24 can be activated to proceed with an in vivo analysis of the nature of the pathology. In this situation, the optical detection device 24 acquires a sequence of optical signals emitted by the suitably energised body tissue and sends these signals to the processing and control unit where they are processed and if necessary displayed on a monitor.

In a preferred embodiment, the detection head 20 also comprises a gap containing methylene blue which is normally used as a contrast liquid to perform analyses using optical devices. Once the zone affected by the pathology "P" has been identified, the gap can be opened on command in such a way as to colour the body tissue surrounding the gap, that is to say, the tissue affected by the pathology that is to be analysed optically. After the opening of the gap, the optical detection device 24 is activated to proceed with the medical analysis.

The presence of the optical detection device 24 advantageously makes it possible to perform an in vivo analysis of the nature of the pathology (and, if necessary, of the chemical composition and the physical structure of the zone affected by pathology "P") without the need to introduce a further instrument into a cavity of the patient. In other words, following the localisation of the part affected by the pathology "P" using the detection elements 21a, 21b, 21c, the operator can perform an analysis directly in situ on the nature of the pathology, thus preserving the patient from being subjected to an excessively invasive analysis and/or any excisions in order to examine and assess the nature of the pathology.

The combined action of the detection elements 21a, 21b, 21c and of the optical detection device 24 advantageously makes the multifunction gamma radiation detector "R" versatile.

The multifunction gamma radiation detector "R" according to the present invention thus allows different medical investigation methods to be combined with a single instrument in such a way as to perform quick, reliable and precise analyses. More specifically, owing to the possibility of locating the zone affected by the pathology "P" using the detection elements 21a, 21b, 21c, the subsequent optical analysis is much more precise since there is the certainty that the detection head 20 has adopted the correct analysis position.

The investigation methods which the detector "R" can therefore perform can therefore be selected from:
  scintigraphic investigation wherein the detection elements 21a, 21b, 21c are activated to detect gamma radiation;
  optical investigation wherein the optical detection device 24 is activated to acquire the sequence of optical signals;
  further, a dual investigation wherein the detection elements 21a, 21b, 21c and the optical detection device 24 are preferably activated simultaneously.

These operational investigation methods are usually selected by the processing and control unit on the basis of the signals coming from the second electronic conversion circuitry.

In detail, the processing and control unit can derive position information on the detection head 20, in particular a numerical value of a position parameter in such a way as to suitably select the operational investigation method.

This numerical value varies depending on the positioning of the detection head 20 relative to the zone affected by the pathology "P". More specifically, this value is substantially zero when the radiation source, that is, the zone affected by the pathology "P", falls in the above-mentioned blind zone W. In this situation, the detection head 20 is oriented in such a way that the zone affected by pathology "P" is frontally facing the detection head 20 at a minimum distance from the front surface 20a of the detection head 20 (FIG. 4D).

When the value of the above-mentioned position parameter is substantially zero, the processing and control unit automatically enables the optical investigation mode since it means that the zone affected by the pathology is located frontally of the detection head 20 at a distance within the blind zone "W", that is to say, it is placed in the correct position to perform an accurate optical analysis.

Alternatively, the investigation methods may be activated or deactivated manually by an operator by means of a controller located on the handgrip 30 of the multifunction gamma radiation detector "R".

The possibility of obtaining a single multifunction gamma radiation detector "R" integrated with an optical detection device 24 advantageously allows first in-situ diagnosis to be performed in such a way as to prevent excisions of the part in question or further invasive examinations.

The present invention achieves the preset aims eliminating the drawbacks of the prior art.

More specifically, owing to the presence of the optical detection device 24, the multifunction gamma radiation detector "R" allows an in vivo analysis to be performed regarding the nature of the pathology.

The arrangement of the detection elements 21a, 21b, 21c angularly distributed around the optical detection device 24 makes it possible to locate quickly the zone affected by the pathology "P" and then perform a precise optical analysis.

Further, the distribution makes it possible to keep the dimensions of the detection head 20 small.

The integration of the optical detection device 24 in the detection head 20 also makes the medical analysis less invasive since there is no need to insert an optical instrument to follow an instrument for locating the pathology.

The multifunction gamma detector "R" is able to locate the pathology, independently of other techniques, in order to direct the detection head 20 into the tissue zone identified in this way and then in order to be capable of analysing the zone with the dedicated optical detection device 24 to obtain data on the nature of the pathology.

The multifunction gamma radiation detector "R" exploits the presence of the blind zone "W" left by the detection elements 21a, 21b, 21c to orient the detection head 20 with precision and certainty relative to the zone affected by the pathology P. More specifically, for the correct orientation of the detection head 20 relative to the zone, use is made of a decrease in the gamma radiation values absorbed by the detection elements 21a, 21b, 21c, gradually as the detection head 20 moves towards the blind zone "W".

The invention claimed is:

1. A multifunction gamma radiation detector comprising:
    a supporting rod;
    a detection head coupled or integrated with a first end of said supporting rod and comprising a plurality of detection elements which are separate from each other for simultaneously detecting gamma radiation directed along respective directions different to each other, each detection element comprising at least one scintillation crystal and a corresponding first electronic conversion circuitry for receiving a scintillation optical signal generated within the crystal and converting the optical signal into an electrical signal, each of said detection elements being associated with a respective collimator made of a material with a high atomic number and suitable to screen the gamma radiation striking said detection element with ana external angle and a predetermined solid angle;
    a handgrip connected or connectable to a second end of the supporting rod and which can be gripped manually by an operator for directing said detector;
    a second electronic circuitry for converting and/or treating the signals, connected to said first electronic conversion device for processing the electrical signal generated by the first electronic conversion circuitry;
    wherein said detection head further comprises at least one optical detection device configured to acquire a sequence of tissue-emitted optical signals from a suitably energised body tissue, wherein said detection elements are angularly distributed on the detection head about said at least one optical detection device and wherein said detection elements define respective solid detection angles shaped and/or oriented in such a way as to define between the solid detection angles a blind zone outside the solid detection angles, said blind zone having a length having a minimum value that is approximately equal to 5 mm and a maximum value that is approximately equal to 50 mm;
    wherein said multifunction scintigraphic detector being insertable and orientable in a cavity of a patient by manual action of the operator in such a way that the detection elements absorb the gamma radiation emitted by the suitably energised body tissue and comprised in said solid detection angles.

2. The detector according to claim 1, wherein said blind zone has a length having a maximum value approximately equal to 20 mm.

3. The detector according to claim 2, wherein said optical detection device has an optical detection axis passing through said blind zone.

4. The detector according to claim 1, wherein said optical detection device has an optical detection axis, and wherein said detection elements have respective collimation axes inclined relative to the optical detection axis.

5. The detector according to claim 1, wherein said detection elements have respective collimation axes diverging out from the detection head.

6. The detector according to claim 1, wherein said detection elements have respective collimation axes converging out from the detection head.

7. The detector according to claim 1, wherein each collimator comprises a respective detection channel having a respective opening lying on a front surface of the detection head.

8. The detector according to claim 1, comprising a processing and control unit configured for:
    receiving the signals coming from said second electronic conversion circuitry and the signals coming from said optical detection device;
    selecting a method of operational investigation of the detector on the basis of said signals coming from the second electronic conversion circuitry;
    also deriving a position information of the detection head.

9. The detector according to claim 8, wherein said operational investigation method of the detector can be selected from:
    scintigraphic investigation wherein said detection elements are activated for detecting gamma radiation; and
    optical investigation wherein said optical detection device is activated for acquiring said sequence of optical signals.

10. The detector according to claim 9, wherein the position information of the detection head is a numerical value of a position parameter, and wherein said processing and control unit automatically enables said optical investigation mode when said position parameter adopts a predetermined value corresponding to a quantity of detected radiation substantially equal to zero.

11. The detector according to claim 9, wherein said handgrip comprises a controller which can be activated by an operator for manually activating or deactivating at least one between said operational investigation methods.

12. The detector according to claim 1, wherein said detection head comprises at least one movement sensor designed for acquiring data relative to an instantaneous position of said detection head in space.

13. The detector according to claim 1, wherein said detection head comprises a hollow space containing methylene blue, said hollow space being openable upon command in such a way as to colour a body tissue surrounding said hollow space.

14. The detector according to claim 1, wherein said optical detection device can be selected between: microstructured fibres; phoswitch;
    optical system for holographic microscopy.

15. A method for using a detector according to claim 1, comprising following steps:
    moving the detection head relative to a gamma radiation source;
    identifying, on the basis of the signals generated by the detection elements during the movement of the detection head, an imbalance of the overall reading of the detection elements corresponding to a position of the detection head which is not frontally aligned to the radiation source;

re-directing the detection head until all the detection elements generate respective signals substantially equal to each other, identifying a positioning of the detection head frontally aligned with the radiation source and arranged in such a way that the source is comprised in a zone of intersection between the solid detection angles;

subsequently, keeping the orientation and positioning of the detection head, axially moving the detection head towards the radiation source until the signals generated by the detection elements are cancelled or reach a value below a predetermined threshold;

following the cancellation of the signals generated by the detection elements or upon reaching a value of said signals below the predetermined threshold, activating said at least one optical detection device capturing at least one image of a zone comprising said radiation source.

16. The detector of claim 4, wherein the optical detection axis is parallel to or coinciding with a longitudinal axis of extension of the detection head.

17. The detector of claim 16, wherein the detection elements have respective collimation axes included relative to the optical detection axis by an angle of between 0° and 90°.

18. A multifunction gamma radiation detector comprising:
a supporting rod;
a detection head coupled or integrated with a first end of said supporting rod and comprising a plurality of detection elements which are separate from each other for simultaneously detecting gamma radiation directed along respective directions different to each other, each detection element comprising at least one scintillation crystal and a corresponding first electronic conversion circuitry for receiving a scintillation optical signal generated within the crystal and converting the optical signal into an electrical signal, each of said detection elements being associated with a respective collimator made of a material with a high atomic number and suitable to screen the gamma radiation striking said detection element with an external angle and a predetermined solid angle, said detection element being configured to allow an operator to locate gamma radiations emitted by a suitably energised body tissue during handling of the detector;
a handgrip connected or connectable to a second end of the supporting rod and which can be gripped manually by an operator for directing said detector;
a second electronic circuitry for converting and/or treating the signals connected to said first electronic conversion device for processing the electrical signal generated by the first electronic conversion circuitry;
wherein said detection head further comprises at least one optical detection device configured to acquire a sequence of tissue-emitted optical signals from said suitably energised body tissue, wherein said detection elements are angularly distributed on the detection head about said at least one optical detection device and wherein said detection elements define respective solid detection angles shaped and/or oriented in such a way as to define between the solid detection angles a blind zone outside the solid detection angles, said blind zone having a length having a minimum value that is approximately equal to 5 mm and a maximum value that is approximately equal to 50 mm;

wherein the detector comprises a processing and control unit configured, for each of said detection element, to derive a value related to a quantity of gamma radiation absorbed by the detection element;

wherein said optical detection device is located and/or oriented in such a way to acquire said sequence of optical signals when said values are cancelled or reach a value below a predetermined threshold for each of the detection element.

19. A multifunction gamma radiation detector comprising:
a supporting rod;
a detection head coupled or integrated with a first end of said supporting rod and comprising a plurality of detection elements which are separate from each other for simultaneously detecting gamma radiation directed along respective directions different to each other, each detection element comprising at least one scintillation crystal and a corresponding first electronic conversion circuitry for receiving a scintillation optical signal generated within the crystal and converting the optical signal into an electrical signal, each of said detection elements being associated with a respective collimator made of a material with a high atomic number and suitable to screen the gamma radiation striking said detection element with an external angle and a predetermined solid angle;
a handgrip connected or connectable to a second end of the supporting rod and which can be gripped manually by an operator for directing said detector;
a second electronic circuitry for converting and/or treating the signals connected to said first electronic conversion device for processing the electrical signal generated by the first electronic conversion circuitry;
wherein said detection head further comprises at least one optical detection device configured to acquire a sequence of tissue-emitted optical signals from a suitably energised body tissue, wherein said detection elements are angularly distributed on the detection head about said at least one optical detection device and wherein said detection elements define respective solid detection angles shaped and/or oriented in such a way as to define between the solid detection angles a blind zone outside the solid detection angles, said blind zone having a length having a minimum value that is approximately equal to 5 mm and a maximum value that is approximately equal to 50 mm;
wherein the detection head is made in the form of a solid body having a cylindrical shape extending along a longitudinal axis of extension and having a flat front surface perpendicular to the longitudinal axis of extension;
wherein the optical detection device is centered on the longitudinal axis of extension and the detection elements are distributed on the front surface around the longitudinal axis of extension in such a way to define said blind zone centered on the longitudinal axis.

20. A multifunction gamma radiation detector according to claim 1 wherein the at least one optical detection device is configured to capture at least one image of the energised body tissue.

* * * * *